(12) United States Patent
Fincato et al.

(10) Patent No.: US 11,079,232 B2
(45) Date of Patent: Aug. 3, 2021

(54) DEVICE COMPRISING A RING OPTICAL RESONATOR

(71) Applicant: STMicroelectronics S.r.l., Agrate Brianza (IT)

(72) Inventors: Antonio Fincato, Cameri (IT); Enrico Stefano Temporiti Milani, Pavia (IT); Maurizio Zuffada, Milan (IT); Angelica Simbula, Cabras (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 0 days.

(21) Appl. No.: 16/511,152

(22) Filed: Jul. 15, 2019

(65) Prior Publication Data
US 2020/0025569 A1 Jan. 23, 2020

(30) Foreign Application Priority Data
Jul. 19, 2018 (FR) ...................................... 1856692

(51) Int. Cl.
*G01C 19/72* (2006.01)
(52) U.S. Cl.
CPC .................................. *G01C 19/727* (2013.01)

(58) Field of Classification Search
CPC ...... G01C 19/64; G01C 19/72; G01C 19/727; G01B 9/02002; G01B 9/0201
See application file for complete search history.

(56) References Cited

U.S. PATENT DOCUMENTS

| | | | |
|---|---|---|---|
| 4,326,803 A | 4/1982 | Lawrence | |
| 4,674,881 A | 6/1987 | Lawrence et al. | |
| 2014/0240712 A1* | 8/2014 | Strandjord | G01C 19/727 356/461 |
| 2015/0098088 A1* | 4/2015 | Qiu | G01C 19/661 356/461 |
| 2015/0288135 A1* | 10/2015 | Qiu | G01C 19/727 372/28 |
| 2016/0334217 A1 | 11/2016 | Strandjord et al. | |
| 2017/0146346 A1* | 5/2017 | Strandjord | G01C 19/721 |
| 2018/0328732 A1* | 11/2018 | Sanders | G01C 19/727 |
| 2019/0049249 A1* | 2/2019 | Wu | G01C 19/727 |

* cited by examiner

*Primary Examiner* — Tarifur R Chowdhury
*Assistant Examiner* — Jonathon Cook
(74) *Attorney, Agent, or Firm* — Slater Matsil, LLP

(57) ABSTRACT

A device includes an optical resonator having four ports including a first port, a second port, a third port, and a fourth port. A first electronic circuit is configured to calculate a first information representative of a power difference between optical signals supplied by two of the four ports. A method of operating a device is also disclosed.

20 Claims, 3 Drawing Sheets

DEVICE COMPRISING A RING OPTICAL RESONATOR

CROSS-REFERENCE TO RELATED APPLICATIONS

This application claims priority to French Patent Application No. 1856692, filed on Jul. 19, 2018, which application is hereby incorporated herein by reference.

TECHNICAL FIELD

The present disclosure generally relates to devices comprising a ring optical resonator, for example, gyroscopes comprising such a ring optical resonator.

BACKGROUND

Gyroscopes comprising a ring optical resonator are known. In such gyroscopes, when the ring optical resonator is not rotating around its axis and an optical signal propagates through the resonator, the resonator exhibits resonance wavelengths, the interval between two successive resonant wavelengths being constant and commonly called free spectral range (FSR). Considering a fixed-order resonance, with resonance wavelength at rest $\lambda R$, when the ring optical resonator is rotating around its axis, an optical signal that is propagating in the resonator in the same direction as the rotation experiences an increase of the resonance wavelength with respect to the wavelength at rest $\lambda R$, and an optical signal that is propagating in the resonator in the opposite direction to the rotation experiences a decrease of the resonance wavelength with respect to the wavelength at rest $\lambda R$. The difference between the resonance wavelength at rest $\lambda R$ and the resonance wavelengths in rotation depends on the rotation speed of the resonator, enabling to determine the rotation speed of the gyroscope.

SUMMARY

An embodiment overcomes all or part of the disadvantages of known devices comprising an optical resonator, and particularly of known devices comprising a ring optical resonator using for example a resonant ring waveguide.

An embodiment provides a gyroscope comprising a resonant ring waveguide where a rotation speed is determined with a greater accuracy than in known gyroscopes comprising a resonant ring waveguide.

An embodiment provides a gyroscope comprising a resonant ring waveguide where certain variations such as temperature variations do not influence the calculation of the rotation speed.

An embodiment provides a gyroscope comprising a resonant ring waveguide where the measurement noise is decreased with respect to that of known gyroscopes comprising a resonant ring waveguide.

An embodiment provides a device comprising an optical resonator having first, second, third, and fourth ports, and a first electronic circuit for calculating a first information representative of a power difference between optical signals supplied by two of the four ports.

According to an embodiment, the optical resonator comprises a first ring waveguide.

According to an embodiment, the resonator further comprises a second waveguide coupled to the first waveguide and linking the first port to the second port, and a third waveguide coupled to the first waveguide and linking the third port to the fourth port.

According to an embodiment, when a first optical signal is supplied to the first port, the first signal is transmitted to the second port and to the third port.

According to an embodiment, the second and third ports form said two of the four ports.

According to an embodiment, the device further comprises a second electronic circuit for calculating a second information representative of a power difference between optical signals supplied by two other of the four ports.

According to an embodiment, the device further comprises a laser source linked to the first and second ports.

According to an embodiment, the laser source has a wavelength adjustable according to a control signal.

According to an embodiment, a resonance wavelength of the resonator is adjustable according to a control signal.

According to an embodiment, the second circuit determines the control signal based on the second information.

According to an embodiment, the second circuit determines the control signal so that the second information is representative of a zero difference.

According to an embodiment, the device further comprises at least one optical modulator.

According to an embodiment, the optical modulator is configured so that optical signals supplied to the first and second ports are modulated at different frequencies.

According to an embodiment, the first circuit is configured to determine an angular speed based on the first information.

An embodiment provides a gyroscope comprising a device as above-defined.

An embodiment provides an integrated circuit comprising a device as above-defined or a gyroscope as above-defined.

An embodiment provides a method for determining a rotation speed of a device as above-defined or a gyroscope as above-defined, wherein the rotation speed is determined based on the first information.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF ILLUSTRATIVE EMBODIMENTS

Figure 1:
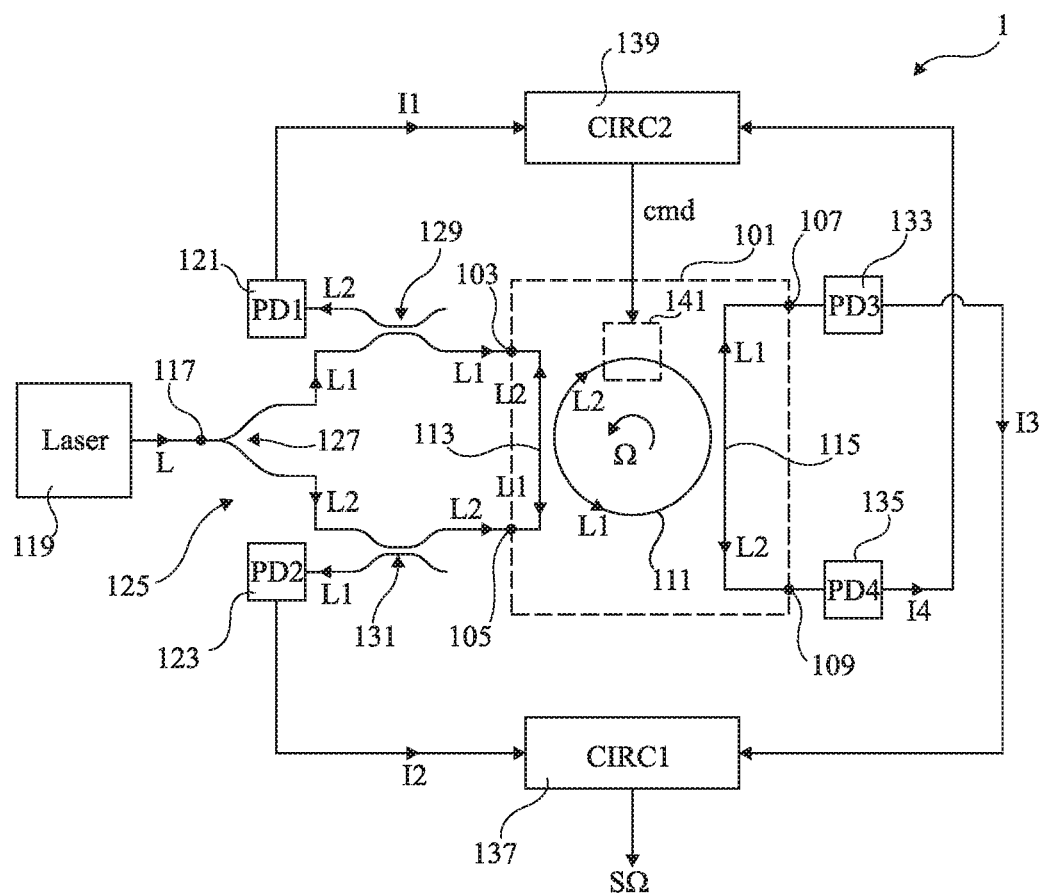
FIG. 1 schematically represents an embodiment of a device comprising a ring optical resonator.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the operation of current optical and electro-optical components such as modulators, switches, couplers, splitters, circulators, etc. has not been described.

Unless otherwise specified, when reference is made to two elements (electrically or optically) connected to each other, this means directly connected without intermediate elements other than conductors or waveguides, and when referring to two elements (electrically or optically) linked to each other, it means that these two elements can be connected or be electrically or optically linked through one or more other elements. In addition, when referring, without further details, to two elements linked or connected together, it means that these two elements are optically linked or connected.

Unless otherwise specified, when reference is made to two waveguides coupled together, this means that the waveguides comprise portions sufficiently close to each other for a signal to pass from one waveguide to the other by evanescent coupling.

Unless otherwise specified, the terms "approximately", "substantially", and "in the order of" are used herein to designate a tolerance of plus or minus 10%, preferably of plus or minus 5%, of the value in question.

FIG. 1 schematically represents an embodiment of a device 1, here a gyroscope, comprising a ring optical resonator.

Device 1 comprises an optical resonator 101 with four ports 103, 105, 107, and 109. More particularly, resonator 101 comprises a ring waveguide 111, a waveguide 113, and a waveguide 115. Waveguide 113 is coupled to waveguide 111 and links input/output ports 103 and 105 of resonator 101. Waveguide 115 is coupled to waveguide 111 and links output ports 107 and 109 of resonator 101.

Ports 103 and 105 are linked to an input port 117 of device 1, port 117 being linked, preferably connected, to a laser source 119 forming part or not of device 1. As an example, laser source 119 supplies a signal having a wavelength in Infrared, for example, in the range from approximately 750 nm to approximately 3,000 nm, being understood that the device described can be adapted to operate at other wavelengths.

In this embodiment, ports 103 and 105 are further linked to respective photodetectors 121 (PD1) and 123 (PD2), for example photodiodes. A connection network 125 enables to link ports 103 and 105 to port 117 and to respective photodetectors 121 and 123.

In the example of FIG. 1, connection network 125 comprises an optical splitter 127 and two optical couplers 129 and 131, here, X couplers. The input of optical splitter 127 is linked, preferably connected, to port 117. An output of splitter 127 is linked to port 103 by coupler 129, coupler 129 also linking port 103 to photodetector 121. The other output of splitter 127 is linked to port 105 by coupler 131, coupler 131 also linking port 105 to photodetector 123.

Ports 107 and 109 are linked, preferably connected, to respective photodetectors 133 (PD3) and 135 (PD4), for example photodiodes.

Device 1 comprises an electronic circuit 137 (CIRC1). Circuit 137 is configured to calculate an information representative of a power difference between two output signals of resonator 101 supplied by ports 105 and 107. More particularly, circuit 137 calculates a difference between output signals of photodetectors 123 and 133, for example, currents, respectively I2 and I3, representative of the optical powers received by these photodetectors. Circuit 137 is thus electrically linked, preferably electrically connected, to photodetectors 123 and 133, to receive output signals I2, I3.

Device 1 further comprises an electronic circuit 139 (CIRC2). Circuit 139 calculates an information representative of a power difference between two output signals of resonator 101 supplied by ports 103 and 109. More particularly, circuit 139 is configured to calculate the difference between output signals of photodetectors 121 and 135, for example, currents, respectively I1 and I4, representative of the optical powers received by these photodetectors. Circuit 139 is thus electrically linked, preferably electrically connected, to photodetectors 121 and 135, to receive output signals I1, I4. As an example, circuit 139 implements a feedback loop receiving as an input signals I1 and I4 and outputting a control signal cmd, the calculation of the difference between signals I1 and I4 being implemented in the feedback loop.

In this embodiment, considering a fixed-order resonance, the resonator 101 has adjustable resonance wavelength. The value of the resonance wavelength of resonator 101, in other words the value of the resonance wavelength of waveguide 111, is determined by the control signal cmd supplied by circuit 139. As an example, waveguide 111 comprises at least one phase modulator 141 receiving signal cmd, for example, at least one accumulation, injection, or depletion phase modulator or, preferably, at least one thermal phase modulator.

In an alternative embodiment, not shown, laser source 119 has an adjustable operating wavelength. In this variation, the value of the operating wavelength of source 119 is determined by a control signal supplied by circuit 139. This alternative embodiment can be implemented in combination or independently of the fact that, for a fixed-order resonance, the resonance wavelength of resonator 101 is adjustable.

In device 1, when source 119 supplies an optical signal L to port 117, connection network 125 supplies corresponding signals L1 and L2 to respective polls 103 and 105, via respective couplers 129 and 131 in this example. A part of the power of signal L1 is then transmitted from port 103 to port 105 and then to photodetector 123, via coupler 131 in this example. Another part of the power of signal L1 is transmitted from port 103 to port 107 linked to photodetector 133, via the coupling between waveguides 113, 111, and 115. Symmetrically, a part of the power of signal L2 is transmitted from port 105 to port 103 and then to photodetector 121, via coupler 129 in this example, another part of the power of signal L2 being transmitted from port 105 to port 109. In waveguide 111, signals L1 and L2 then propagate in a reverse direction with respect to each other.

Figure 2:
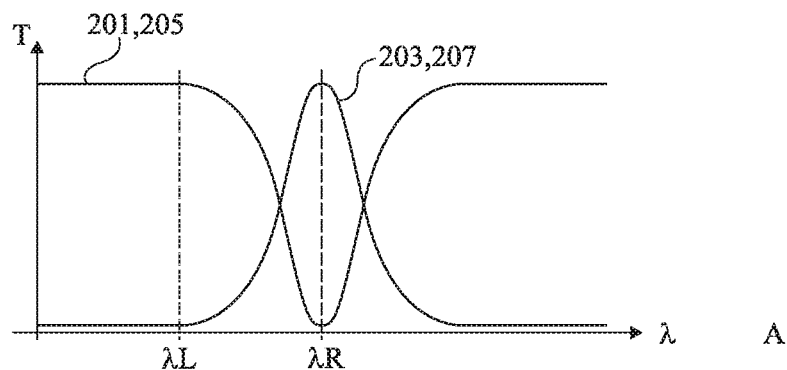
FIG. 2 illustrates the variation, according to the wavelength, of power transmission coefficients of optical signals between ports of the device of FIG. 1.
Figure 2:
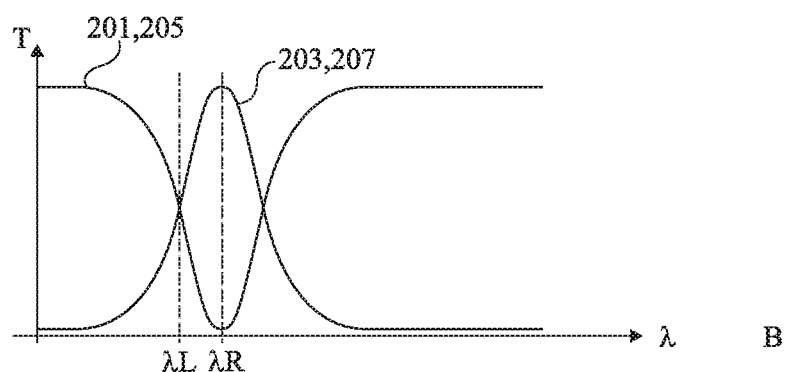
Figure 2:
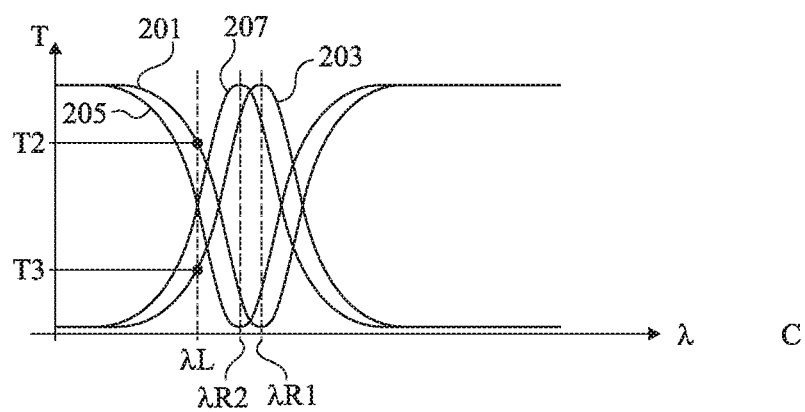

FIG. 2 illustrates, according to the wavelength λ (in abscissa) and at three operating steps A, B, and C, the variation of transmission coefficients T (in ordinate) of the power of signals L1 and L2 between different ports of device 1. More particularly, curves 201 and 203 illustrate the variation of coefficient T of signal L1 respectively between ports 103 and 105 and between ports 103 and 107, curves 205 and 207 illustrating the variation of coefficient T of signal L2 respectively between ports 105 and 103 and between ports 105 and 109.

At step A, device 1 is in a state where it is not rotating around the axis of ring waveguide 111 and where, for a fixed-order resonance, a resonance wavelength λR of ring waveguide 111 is not controlled by circuit 139 yet. Laser source 119 supplies device 1 with a signal L of wavelength λL and ring waveguide 111 resonates at wavelength λR. For signals L1 and L2, when varying their wavelength, it would be observed that, at wavelength λR, the power of signal L1 transmitted from port 103 to port 105 (curve 201) and the power of signal L2 transmitted from port 105 to port 103

(curve 205) would be minimum while the power of signal L1 transmitted from port 103 to port 107 (curve 203) and the power of signal L2 transmitted from port 105 to port 109 (curve 207) would be maximum. Further, the more distant the wavelength would be from wavelength λR, the more this phenomenon would be reversed. Due to the fact that device 1 is not rotating, curves 201 and 203 (signal L1) are confounded with respective curves 205 and 207 (signal L2).

At step B, circuit 139 supplies a control signal cmd to waveguide 111 to modify the resonance wavelength λR of waveguide 111. More particularly, circuit 139 calculates the difference between output signals I1 and I4 of photodetectors 121 and 135. Such a difference or information is representative of the difference between the power of signal L2 supplied by port 103 and the power of signal L2 supplied by port 109, and thus of the difference between curves 205 and 207. Circuit 139 is configured to determine, based on this information, signal cmd so that, at the wavelength λL of signals L1 and L2, the power of signal L2 transmitted to port 103 (curve 205) is substantially equal, preferably equal, to the power of signal L2 transmitted to port 109 (curve 207). This amounts to being at the crossing of curves 205 and 207 as shown in FIG. 2, step B. Since the device is not rotating, curves 201 and 203 (signal L1) remain confounded with respective curves 205 and 207 (signal L2).

At step C, device 1 is rotating at an angular speed Ω (FIG. 1) with respect to the central axis of waveguide 111. The Sagnac effect resulting from this rotation results in that, for signal L1 which travels through waveguide 111 in the rotation direction of waveguide 111, waveguide 111 resonates at a wavelength λR1 greater than wavelength λR of step B and, conversely, for signal L2 which travels through the waveguide 111 the direction inverse to the rotation direction of waveguide 111, waveguide 111 resonates at a wavelength λR2 smaller than wavelength λR of step B.

Thus, curves 201 and 203 are offset with respect to curves 205 and 207. At the same time, resonance wavelength λR2 of waveguide 111 is controlled by circuit 139 so that, at wavelength λL of laser source 119, curves 205 and 207 cross each other. The crossing of the curves 201 and 203 then takes place in the vicinity of the wavelength λL, and, at the wavelength λL, curves 201 and 203 exhibit slopes.

Circuit 137 calculates the difference between output signals I2 and I3 of photodetectors 123 and 133. Such a difference or information is representative of the difference between the power of signal L1 transmitted to port 105 (coefficient T2, curve 201) and the power of signal L1 transmitted to port 107 (coefficient $T_3$, curve 203) or, in other words, of the difference between coefficients T2 and T3. The difference between coefficients T2 and T3 is substantially proportional or proportional to the offset, due to the Sagnac effect, between curves 201, 203 and curves 205, 207. The difference between coefficients T2 and T3 is thus substantially proportional or proportional to rotation speed Ω of waveguide 111 and thus of device 1.

Circuit 137 is configured to deduce from the difference between signals I2 and I3 the value SΩ (FIG. 1) of speed Ω, for example by means of a lookup table with rotation speed values, where such a table may be determined during a previous calibration step and is for example stored in a static memory (not shown in FIG. 1) of circuit 137.

An advantage of calculating speed Ω based on the difference between currents I2 and I4, in particular in the vicinity of the crossing of curves 201 and 203, is that the gain of detection of a variation of speed Ω is greater than if speed Ω was directly calculated from the difference between wavelengths λR1 and λR2. This is all the truer as the quality factor of resonator 101 is high, the slopes of curves 201 and 203 increasing with the quality factor.

In a device where the minimum values of currents I1 and I2 would be detected to measure the difference between wavelengths λR1 and λR2, for each of current I1 and I2 measured at the level of its minimum value, the dark current part would be significant as compared with the photogenerated current part. In device 1, in the vicinity of the crossing of curves 201 and 203, the dark current part in each of currents I2 and I3 is small as compared to the photogenerated current part, for example at least twice as small. The decrease of the dark current part in a current measured to determine speed Ω causes an increase in the accuracy with which the speed is determined.

An advantage of controlling wavelength λR2 based on the difference between the output signals of photodetectors 121 and 135 is that the difference between the output signals of photodetectors 123 and 133, and thus the speed Ω calculated from this difference, is insensitive to slow variations with respect to the update time of signal cmd allowing such a control, that is, variations at frequencies smaller than the bandwidth of the feedback loop of circuit 139. The variations of the temperature of device 1 and in particular of the temperature of waveguide 111 are an example of slow variations with respect to the response time of device 1.

The above-described operation may be adapted to the case where circuit 139 controls wavelength λL rather than resonance wavelength λR2 of waveguide 111. This operation may also be adapted to the case where circuit 139 controls resonance wavelength λR2 of waveguide 111 and wavelength λL of laser source 119.

In a variation, not shown, signals L1 and L2 supplied to respective ports 103 and 105 are power-modulated at different frequencies, for example, frequencies in the order of one or a plurality of hundreds of kilohertz. The detection of the power of signal L1 received by each of photodetectors 123 and 133 is then performed synchronously with respect to the modulation frequency of signal L1, the detection of the power of signal L2 received by each of photodetectors 121 and 135 being performed synchronously with respect to the modulation frequency of signal L2. This enables to decrease, or even to suppress, the measurement noise. In particular, this enables to decrease, or even to suppress, in the measurements of the power of signal L1, the noise due to parasitic reflections of signal L2 all the way to photodetectors 123 and/or 133 and, in the measurements of the power of signal L2, the noise due to parasitic reflections of signal L1 all the way to photodetectors 121 and/or 135. As a result, the value SΩ of speed Ω is calculated with a greater accuracy.

As an example, in device 1, this variation is implemented by adding a modulator between splitter 127 and coupler 129, and a modulator between splitter 127 and coupler 131, the modulators being for example of Mach-Zehnder or electro-absorption type.

In other alternative embodiments of device 1 described in relation with FIG. 1, connection network 125 may be modified. In particular, couplers 129, 131 may be implemented with optical circulators rather than with X couplers. An advantage of optical circulators over X couplers is that power losses and parasitic reflections are decreased.

Figure 3:
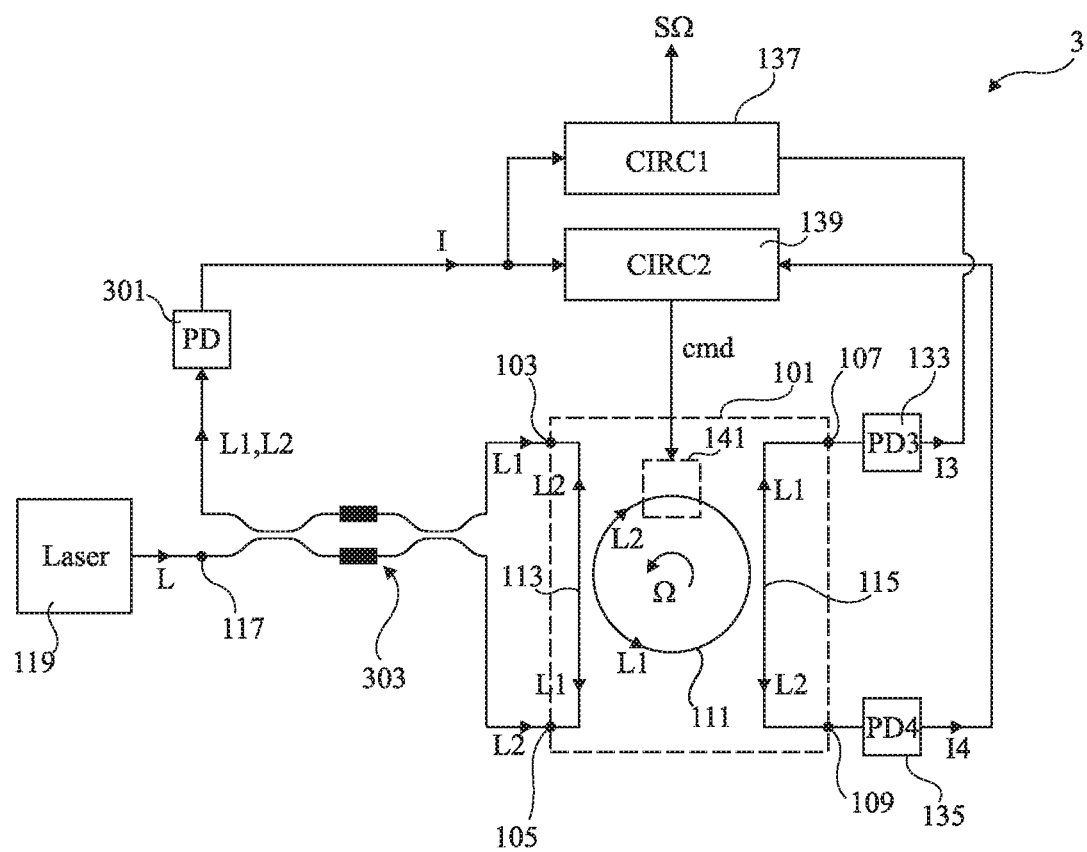
FIG. 3 schematically represents another embodiment of a device comprising a ring optical resonator.

FIG. 3 schematically represents another embodiment of a device 3, here, a gyroscope, comprising a resonant ring waveguide.

Device 3 comprises, like device 1, resonator 101, photodetectors 133 and 135 linked, preferably connected, to respective ports 107 and 109, circuit 137 electrically linked, preferably electrically connected, to photodetector 133, circuit 139 electrically linked, preferably electrically connected, to photodetector 135, and port 117 linked, preferably connected, to laser source 119.

However, unlike in device 1, in device 3, ports 103 and 105 of the resonator are alternately linked to a same photodetector 301 (PD), for example, a photodiode, by an optical switch 303, for example a Mach-Zehnder type modulator. Port 117 is also alternately linked to ports 103 and 105 by switch 303. Switch 303 thus plays the role of a connection network. The two circuits 137 and 139 are electrically linked, preferably electrically connected, to the output of photodetector 301, to receive the output signal of the photodetector, in this example, a current I representative of the power of an optical signal received by the photodetector.

Device 3 operates by alternating first and second operating phases.

In a first operating phase corresponding to a first state of switch 303, the switch supplies, based on signal L, signal L2 to port 105, and links port 103 to photodetector 301 so that signal L2 supplied by port 103 is transmitted all the way to photodetector 301. Output signal I of photodetector 301 is then representative of the power of signal L2 transmitted from port 105 to port 103. Similarly to what has been described in relation with FIG. 2, circuit 139 then determines signal cmd based on the difference between signals I and I4.

In a second operating phase corresponding to a second state of switch 303, the switch supplies, from signal L, signal L1 to port 103, and links port 105 to photodetector 301 so that signal L1 supplied by port 105 is transmitted to photodetector 301. The output signal I of photodetector 301 is then representative of the power of signal L1 transmitted from port 103 to port 105. Similarly to what has been described in relation with FIG. 2, circuit 137 then determines the value SΩ of speed Ω based on the difference between signals I and I3. In this second operating phase, circuit 139 is preferably configured to maintain signal cmd at the value determined during the previous first phase.

The frequency of the first and second phases is preferably greater, for example at least ten times greater, than the frequency of variations to which device 3 is submitted, for example, variations of temperature, of speed Ω, etc. The duration of each first phase and of each second phase is for example in the range from approximately 1 µs to approximately 1 ms. As an example, the alternation between the first and second phases may be controlled by a signal, for example, periodic, this signal being then supplied to switch 303 and to circuits 137 and 139.

Due to the fact that, during each of the first and second phases, a single signal L1 or L2 flows through device 3, this enables to suppress a possible influence of signal L2 on the measurements performed from signal L1, and conversely.

Further, speed Ω being calculated in the same way in devices 1 and 3, device 3 benefits from the same advantages as device 1 regarding the calculation of speed Ω.

Further, as in device 1, in a variation, not shown, of embodiment of device 3, signals L1 and L2 are modulated at different frequencies. In this case, the measurement of currents I and I4 during the first phases is performed in synchronized fashion with the modulation frequency of signal L2, the measurement of currents I and I3 during the second phases being performed in synchronized fashion with the modulation frequency of signal L1.

As an example, this alternative embodiment is implemented by providing a first modulator between switch 303 and port 103 to modulate the power of signal L1, and a second modulator between switch 303 and port 105 to modulate the power of signal L2. Such a configuration enables, in addition to the decrease, or even the suppression, of the measurement noise, to avoid for a part of the power of signal L to return to laser 119. Preferably, the first modulator is only active during the second operating phases, the second modulator only being active during the first operating phases.

In the above description, ring waveguide designates a waveguide closed on itself, for example, a circular or rectangular waveguide or a spiral-shaped waveguide. It should be noted that, for an identical occupied surface area, the use of a spiral-shaped waveguide 111 enables to form a longer waveguide than if it had been circular.

In a preferred embodiment, the above-described device 1 or 3 is implemented in a same chip or in a same integrated circuit. For example, a same silicon layer comprises the waveguides, the photonics components and the electronic components (circuits CIRC1 and CIRC2) of the device.

Various embodiments and variations have been described. It should be understood by those skilled in the art that certain characteristics of these various embodiments and variations may be combined and other variations will occur to those skilled in the art. In particular, although circuits 137 and 139 have been shown and described as two separated electronic circuits, circuits 137 and 139 may correspond to a single electronic circuit.

Furthermore, although this has not been described, the value of the angular speed can also be deduced from the difference between a first signal representative of the difference between the power of signal L2 supplied by port 103 and the power of signal L2 supplied by port 109, and a second signal representative of the difference between the power of the signal L1 provided by the port 105 and the power of the signal L1 provided by the port 107, the first and second signals being for example provided by the respective circuits CIRC2 and CIRC1.

Finally, the practical implementation of the described embodiments and variations is within the abilities of those skilled in the art based on the functional indications given hereinabove. In particular, in the described embodiments and variations, resonator 101, the optical and optoelectronic components, and circuits 137 and 139, may be formed on a same chip, or at least a part of the resonator may be formed on a chip different from that where circuits 137 and 139 are formed to benefit from different manufacturing technologies.

What is claimed is:

1. A device comprising:
   an optical resonator comprising a first port, a second port, a third port, and a fourth port;
   a first electronic circuit configured to calculate a first information representative of a power difference between a second-port optical signal supplied by the second port and a third-port optical signal supplied by the third port, the second-port optical signal and the third-port optical signal originating from a laser source; and
   a second electronic circuit configured to calculate a second information representative of a power difference between a first-port optical signal supplied by the first port and a fourth-port optical signal supplied by the fourth port, the first-port optical signal and the fourth-port optical signal originating from the laser source, the second information being used to control a resonance wavelength of the optical resonator so that the power difference between the first-port optical signal and the fourth-port optical signal is zero at a wavelength of the laser source.

2. The device of claim 1, wherein the optical resonator comprises a first ring waveguide.

3. The device of claim 2, wherein the optical resonator further comprises a second waveguide coupled to the first ring waveguide and linking the first port to the second port, and a third waveguide coupled to the first ring waveguide and linking the third port to the fourth port.

4. The device of claim 3, wherein the device is configured so that a initial optical signal is supplied to the first port and a first part of the initial optical signal is transmitted to the second port by the second waveguide to produce the second-port optical signal and wherein a second part of the initial optical signal is transmitted to the third port by the first ring waveguide to produce the third-port optical signal.

5. The device of claim 1, wherein the laser source is linked to the first port and the second port.

6. The device of claim 5, wherein the laser source has a wavelength adjustable according to a laser control signal.

7. The device of claim 6, wherein the second electronic circuit determines the laser control signal based on the second information.

8. The device of claim 7, wherein the second electronic circuit is configured to determine the laser control signal so that the second information is representative of a zero difference.

9. The device of claim 1, further comprising an optical modulator.

10. The device of claim 9, wherein the optical modulator is configured so that optical signals supplied to the first and second ports are modulated at different frequencies.

11. The device of claim 1, wherein the first electronic circuit is configured to determine an angular speed based on the first information.

12. A device comprising:
an optical resonator comprising a first port, a second port, a third port, and a fourth port;
a laser source linked to the first port and the second port;
a first electronic circuit configured to calculate a first information representative of a power difference between a second-port optical signal supplied by the second port and a third-port optical signal supplied by the third port, the second-port optical signal and the third-port optical signal originating from the laser source; and
a second electronic circuit configured to calculate a second information representative of a power difference between a first-port optical signal supplied by the first port and a fourth-port optical signal supplied by the fourth port, the first-port optical signal and the fourth-port optical signal originating from the laser source, the second information being used to control a resonance wavelength of the optical resonator so that the power difference between the first-port optical signal and the fourth-port optical signal is zero at a wavelength of the laser source.

13. The device of claim 12, wherein the optical resonator comprises:
a first ring waveguide;
a second waveguide coupled to the first ring waveguide and linking the first port to the second port; and
a third waveguide coupled to the first ring waveguide and linking the third port to the fourth port.

14. The device of claim 13, wherein the device is configured so that an initial optical signal is supplied to the first port by the laser source and a first part of the initial optical signal is transmitted to the second port by the second waveguide to produce the second-port optical signal and wherein a second part of the initial optical signal is transmitted to the third port by the first ring waveguide to produce the third-port optical signal.

15. The device of claim 12, wherein the laser source has a wavelength adjustable according to a control signal wherein the second electronic circuit is configured to determine the control signal based on the second information.

16. The device of claim 15, wherein the second electronic circuit is configured to determine the control signal so that the second information is representative of a zero difference.

17. A method for determining a rotation speed of a device that includes an optical resonator comprising a first port, a second port, a third port, and a fourth port, the method comprising:
transmitting an initial optical signal from a laser source to the first port;
directing a first part of the initial optical signal to the third port via a first ring waveguide to produce a third-port optical signal;
directing a second part of the initial optical signal to the second port via a second waveguide to produce a second-port optical signal;
calculating a first information representative of a power difference between the second-port optical signal and the third-port optical signal;
determining the rotation speed of the device with respect to a central axis of the first ring waveguide based on the first information transmitting a second initial optical signal from the laser source to the second port;
directing a first part of the second initial optical signal to the fourth port via the first ring waveguide to produce a fourth-port optical signal;
directing a second part of the second initial optical signal to the first port via the second waveguide to produce a first-port optical signal; and
calculating a second information representative of a power difference between the fourth-port optical signal and the first-port optical signal; and
using the second information to control a resonance wavelength of the optical resonator so that the power difference between the first-port optical signal and the fourth-port optical signal is zero at a wavelength of the laser source.

18. The method of claim 17, further comprising determining an angular speed based on the first information.

19. A device comprising:
an optical resonator comprising:
a first port being configured to receive an initial optical signal from a laser source and direct a first part of the initial optical signal to a third port via a first ring waveguide to produce a third-port signal and direct a second part of the initial optical signal to a second port via a second waveguide to produce a second-port signal;
the second port being configured to receive a second initial optical signal from the laser source and direct a first part of the second initial optical signal to a fourth port via the first ring waveguide to produce a fourth-port signal and direct a second part of the second initial optical signal to the first port via the second waveguide to produce a first-port signal; and
a first electronic circuit configured to calculate a first information representative of a power difference between the second-port signal and the third-port signal and being configured to determine from the first information an angular speed of the optical resonator with respect to a first axis of the first ring waveguide; and a second electronic circuit configured to calculate a second information representative of a power difference between the first-port signal and the fourth-port signal and being configured to supply a control signal based on the second information to the first ring waveguide to vary a resonance wavelength of the first ring waveguide so that the power difference between the first-port signal and the fourth-port signal is zero at a wavelength of the laser source.

20. The device of claim 19, wherein the first ring waveguide comprises a phase modulator configured to receive the control signal.

* * * * *